United States Patent [19]

Gsponer et al.

[11] Patent Number: 4,537,302

[45] Date of Patent: Aug. 27, 1985

[54] DEVIATING STATION FOR HANDLING ARRANGEMENT, AND HANDLING ARRANGEMENT PROVIDED THEREWITH

[75] Inventors: Arnold Gsponer, Oberuzwil, Switzerland; Werner Huber; Milan Petrovic, both of Brunswick, Fed. Rep. of Germany

[73] Assignee: Bühler - Miag GmbH, Brunswick, Fed. Rep. of Germany

[21] Appl. No.: 441,799

[22] Filed: Nov. 15, 1982

[30] Foreign Application Priority Data

Nov. 13, 1981 [DE] Fed. Rep. of Germany ....... 3145104

[51] Int. Cl.³ ............................................ B65G 15/14
[52] U.S. Cl. .................... 198/626; 198/861.3; 414/139
[58] Field of Search ............... 198/626, 864, 627, 628, 198/586, 313, 839, 842, 716; 414/139, 144, 145

[56] References Cited

U.S. PATENT DOCUMENTS

| 779,465 | 1/1905 | Carr | 414/139 |
| 2,539,524 | 1/1951 | Rixon | 198/626 |
| 2,987,166 | 6/1961 | Gray | 198/628 X |
| 3,910,405 | 10/1975 | Couperus et al. | 198/628 |
| 3,982,626 | 9/1976 | Mehta | 198/626 |
| 4,440,537 | 4/1984 | Blattermann | 198/864 |

FOREIGN PATENT DOCUMENTS

| 1032171 | 6/1958 | Fed. Rep. of Germany | 198/864 |
| 1204135 | 10/1965 | Fed. Rep. of Germany | 198/627 |
| 714050 | 9/1966 | Italy | 198/626 |
| 2017034 | 10/1979 | United Kingdom | 198/626 |

Primary Examiner—Joseph E. Valenza
Assistant Examiner—Jonathan D. Holmes
Attorney, Agent, or Firm—Michael J. Striker

[57] ABSTRACT

A deviating station for a handling arrangement has a plurality of supporting rollers arranged on a supporting frame in groups so as to form a plurality of supporting points for a movable band conveyor element and a movable cover band element of the arrangement, and a shape-variable roller holder which is arranged to support the supporting rollers of at least some of the supporting points of at least one of the movable elements and follows the movement of the band conveyor element and the cover band element.

9 Claims, 6 Drawing Figures

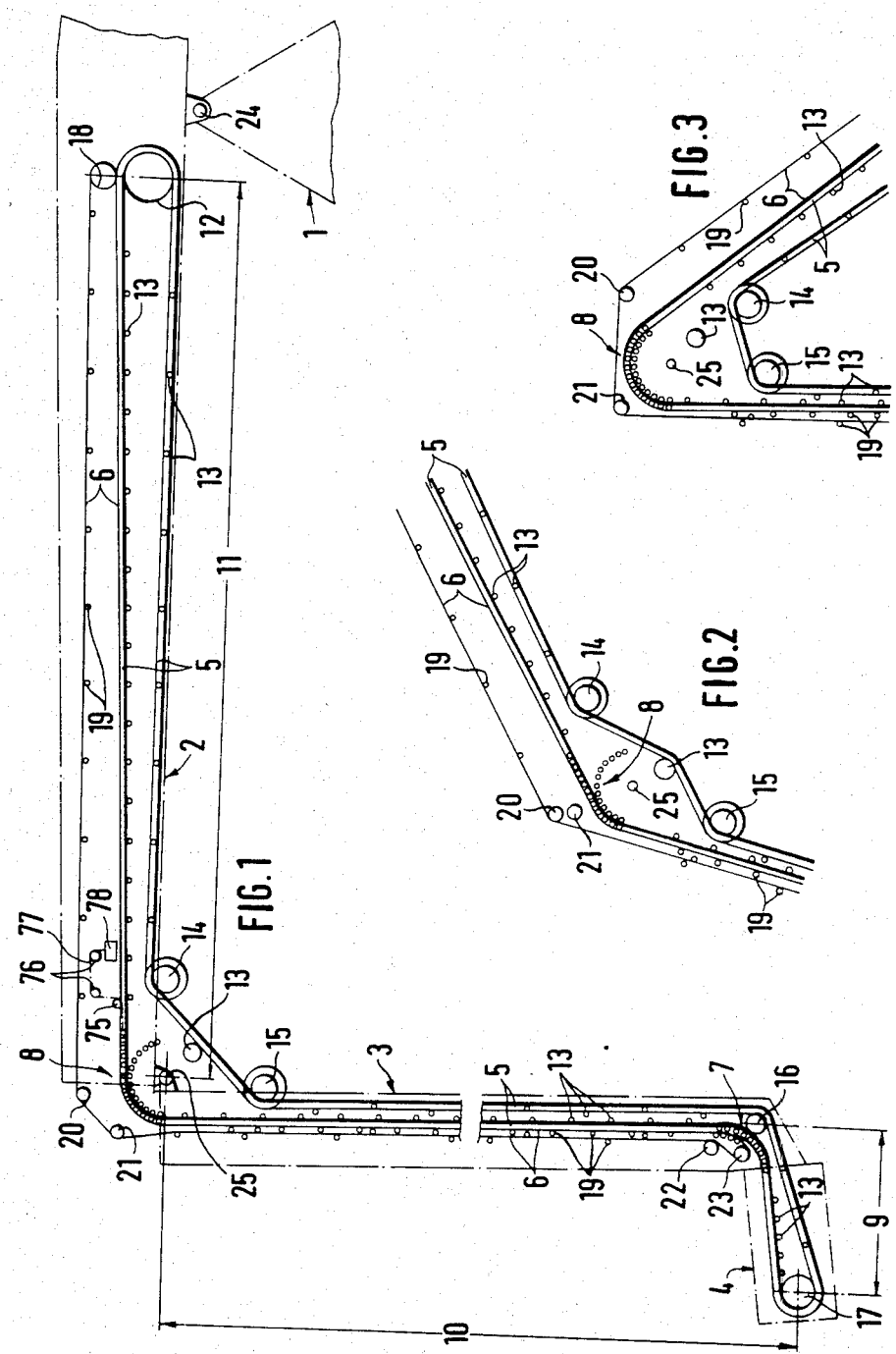

DEVIATING STATION FOR HANDLING ARRANGEMENT, AND HANDLING ARRANGEMENT PROVIDED THEREWITH

BACKGROUND OF THE INVENTION

The present invention relates to a deviating station for a handling arrangement, and a handling arrangement provided therewith. More particularly, the present invention relates to a deviating station for a handling arrangement with a band conveyor having vertical and horizontal runs and a corrugated edge belt closed by a cover band.

Deviating stations and handling arrangements of the above mentioned general type are known in the art. The band conveyor has at least two portions of which one portion is position-variable relative to the other portion, and the deviating station includes a plurality of supporting rollers arranged in groups in correspondence with the band deviation or a supporting frame so as to form supporting points for the band conveyor and the cover band. The term "supporting frame" is used to identify a supporting steel structure of one band portion of two portions of the band conveyor movable relative to one another about a pivot axis. Handling arrangements of the art described here are used, for example, for unloading of ships and the like and conventionally have an extensible and retractible bracket supported on a mast, and a normally or inclinably adjustable frame suspended on its front end. The bracket and the frame receive a front run of a band conveyor which either embraces a throughgoing conveyor band with a band deviating station in a pivot point between both, or has for each run a particular conveying band with a transverse station in the above mentioned pivot point. A material supply device such as a shovel drum, a shovel wheel, or the like, provided at the lower end of the frame charges the conveyor run, the material discharge means or intermediate conveyor transfers the material of the subsequent second conveyor run and transports it further. At the lower end of the frame or the first conveyor run, a further deviating station can be provided, and the conveyor band can be again deviated and guided to the material supply device. During working movement of the bracket, the frame and the material supply device, the band portions of the band conveyor perform relative movements relative to one another, and the angle between the band portions and thereby the band angle in the deviating station changes. Since it means in the region of the deviating station also a relative movement between the supporting rollers arranged on the supporting frame, on the one hand, and the band conveyor and its cover band, on the other hand, there is a danger of damaging loading between both and as a result of it there is also a danger of deformations and damages of the supporting rollers and their bearings, as well as of the band conveyor and the cover band.

SUMMARY OF THE INVENTION

Accordingly, it is an object of the present invention to provide a deviating station and a handling arrangement which avoids the disadvantages of the prior art.

More particularly, it is an object of the present invention to provide a deviating station and a handling arrangement with the same, which exclude damaging loading and are suitable both for positive deviation and negative deviation.

In keeping with these objects and with others which will become apparent hereinafter, one feature of the present invention resides, briefly stated, in a deviating station which has in accordance with the present invention a shape-variable roller holder arranged to support supporting rollers of at least some of the supporting points of a band conveyor or a cover band and follow the movement of the band conveyor and the cover band.

The shape-variable roller holder and the supporting rollers arranged on the same act in such a manner that, under the action of position changes in the band portions relative to one another, the supporting rollers synchronously move along with full maintenance of their supporting effect, and collisions between them and the band conveyor and the cover band are reliably prevented.

In accordance with another advantageous feature of the present invention, which provides for a simple construction and satisfies all requirements in the sense of the point movability, the roller holder is formed as a link chain with its one end pivotally connected with the supporting frame and its another end connected with a tensioning means.

For providing considerable transverse rigidity between the band support at one longitudinal side and the same at the other longitudinal side, on the one hand, and guaranteeing between the supporting rollers of the cover band and the supporting rollers of the band conveyor a certain radial axial distance against damaging pressure or force transmitting touching contact, still another feature of the present invention is that the roller holder includes a plurality of cross bars which bridge the band conveyor and the cover band and are pivotally connected with one another by a connecting member and also rest with both their ends on supporting elements mounted on the supporting frame, wherein the supporting elements are guided radially and adjusted by an adjusting means.

In accordance with a further structurally advantageous feature of the present invention, each bearing cross bar includes a traverse which bridges the band conveyor and the conveyor band and two bearing bodies connected with the traverse at the longitudinal side of the band conveyor and forming together with the same a unit, wherein the bearing bodies receive bearing axles supporting the supporting rollers for the cover band or the band conveyor.

For preventing lying of the supporting roller, during positive deviation on the band conveyor and during negative deviation, on the cover band in the event of lifting of the bearing cross bar from its supporting element in the supporting frame, which takes place in the case of relative movement between the band portions, the weight of the roller holder in accordance with still a further feature of the present invention is compensated.

In accordance with still a further feature of the present invention, this compensation is performed in such a manner that the roller holder at both sides of the band conveyor is provided with running holders which are arranged on the supporting guide provided at each side of the band conveyor and connected with its band portion for movement so as to form a unit.

In accordance with an additional feature of the present invention, the running rollers are advantageously arranged on the correspondingly long bearing axles of the supporting rollers, so that special bearing axles can be dispensed with.

Still another feature of the present invention is that the supporting frame is provided, for receiving the bearing cross bar of the roller holder, with two supporting segments which are supported in the region of longitudinal sides of the band conveyor on an axle segments and are adjustable relative to the latter by adjusting means, wherein both axle segments are mounted on a common axle bar defining the deviation axis. With this construction of the supporting frame, the manufacturing inaccuracies can be compensated in a simple manner and the band running can be corrected in the shortest time.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a view showing schematically an unloading arrangement for unloading ships with a band conveyor having three band portions and guided over two deviating stations, and a cover band associated therewith;

FIG. 2 is a view showing an upper deviating station of FIG. 1 in another relative position of the band portion;

FIG. 3 is a view substantially corresponding to the view of FIG. 2 but showing the upper deviating station in a further relative position of the band portion;

DESCRIPTION OF THE PREFERRED EMBODIMENT

Figure 4:
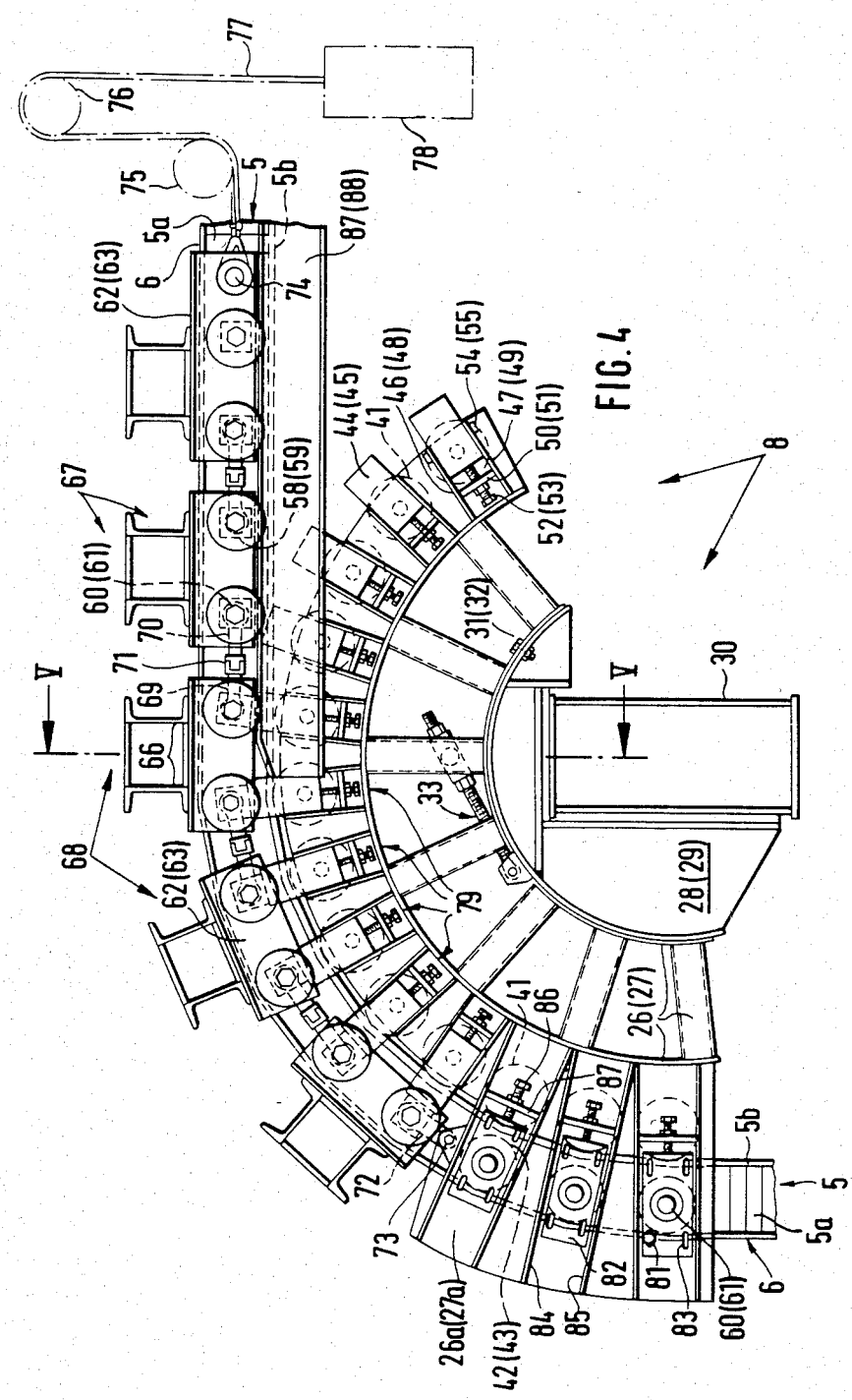
FIG. 4 is a side view of a construction of the upper deviating station on an enlarged scale.

A deviating station in accordance with the present invention is, for example, a part of an unloading arrangement for unloading from ships, for example for unloading grain, coal, and other particulate materials. The arrangement includes substantially a rotatable mast 1, a retractible and extensible bracket 2 pivotally supported on the mast 1, a supporting frame 3 which is pivotally connected with the front end of the bracket 2 and is adjustable relative to the latter in a known manner by an adjusting device such as cylinder-and-piston system, spindle drive, or toothed rack drive, etc., and a material supply device 4, for example shovel drum, as shown in FIG. 1. The adjustment of the bracket 2 is performed with the aid of known devices, such as a hydraulic or pneumatic cylinder-and-piston system, a spindle pulling mechanism, a rope pulling mechanism, or other known adjustment means.

The bracket 2, the supporting frame 3, and the supporting structure of the material supplying device 4 accommodate a band conveyor 5 which is formed as a corrugated edge belt 5b having corrugated edges 5a and associated with a transversely stiff band 6.

In a lower deviating station 7, the band conveyor 5 together with the cover band 6 deviates from the material supply device 4 in the supporting frame 3. In an upper deviating station 8, the deviation takes place from the supporting frame 3 in the bracket 2. By these deviations, three band portions are formed, namely a band portion 9 in the region of the material supply device 4, a band portion 10 in the region of the supporting frame 3, and a band portion 11 in the region of the bracket 2. Outside of both deviating stations 7 and 8, the band conveyor 5 moves over a driving drum 12, supporting rollers 13, and deviating rollers 14, 15, 16, 17, whereas the cover band 6 moves over a driving drum 18, supporting rollers 19 and deviating drums 20, 21, 22, 23. The pivot axis of the bracket 2 on the mast 1 is identified with reference numeral 24, whereas the pivot axis between the bracket 2 and the supporting frame 3 is identified with reference numeral 25.

Position-variability of the band conveyor 5 and the cover band 6 in the region of the deviating station 8 which is obtained by position changes or displacement of the bracket 2 and the supporting frame 3, is shown in FIGS. 2 and 3. When contrary to the shown embodiment the material supply device 4 is not movable or turnable relative to the supporting frame 3, an adjustability of the material supplying device 4 is provided so as to obtain in the deviating station 7 the respective position changes in the band portions 9 and 10.

The constructions of both deviating stations 7 and 8 in the sense of an unobjectionable damage-free guidance of the band conveyor 5 and the cover band 6 are identical in principle. The difference, however, is that in the deviating station 8 the position-variable supporting rollers of the roller group at a plurality of supporting points of the cover band are arranged on a shape-variable roller holder because of the relative movability of the band portions 10 and 11. In contrast, in the deviating station 7 such a roller holder is not needed, the supporting rollers being here arranged directly on the supporting frame 3, and no relative movement takes place between the band portions 9 and 10 because of the rigid connection of the material supply device 4 with the supporting frame 3.

Figure 5:
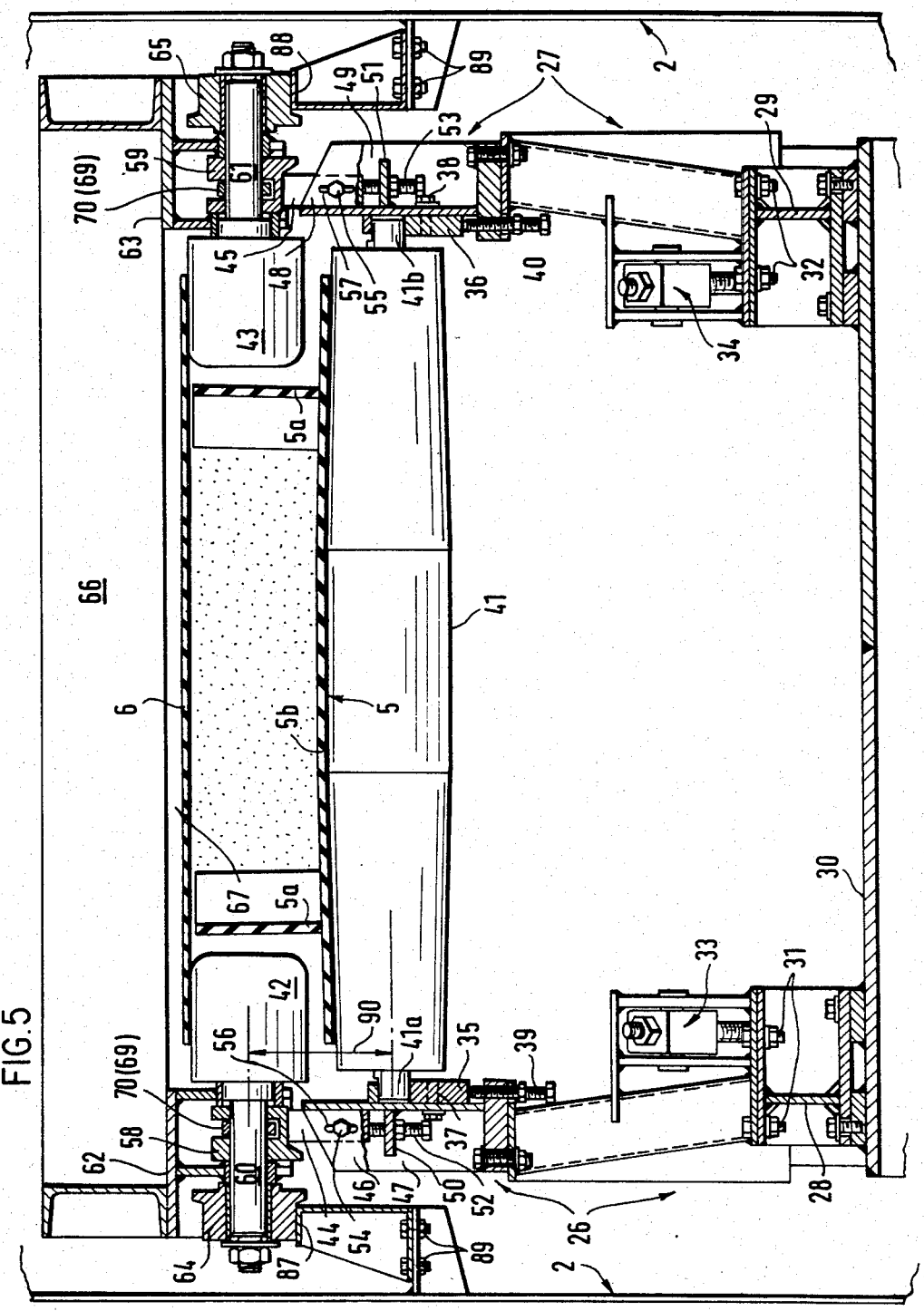
FIG. 5 is a view showing a section taken along the line V—V in FIG. 4, but on a different scale.

As can be seen particularly from FIGS. 4 and 5, showing the upper deviating station 8, supporting parts of the deviating station are formed by two supporting segments 26 and 27 which are supported at each longitudinal side of the band conveyor 5 on a respective axle segment 28 or 29 and connected by screws 31 or 32. After releasing of the screws 31 and 32 extending in respective elongated openings, each supporting segments 26 and 27 can be displaced with the aid of an associated spindle drive 33 or 34 shown in FIG. 5 in a circumferential direction on its segment 28 or 29. Both axle segments 28 and 29 are, in turn, mounted on a common axle bar 30 which is a part of the supporting frame 3 shown in FIG. 1 and is connected with the latter by welding.

Each of the supporting segments 26 and 27 has the shape of a circular arc. Bearing blocks 35 and 36 are mounted by screws 37 and 38 with a uniform distribution over the circular arcs and radially displaceable with the aid of screws 39 or 40. Each bearing block 35 of the supporting segment 26 is located axially opposite a respective one of the bearing blocks 36 on the supporting element 27. Each of the blocks can be displaced relative to the other block with the aid of its adjusting screw 39 or 40 radially outwardly or inwardly on the associated supporting segment 26 or 27. Each bearing block pair composed of one bearing block 35 and one bearing block 36 forms a bearing for a supporting roller 41 which carries the belt 5b of the band conveyor 5. A bearing pin 41a of the supporting roller 41 is received in a respective bearing opening in the bearing block 35, and another bearing pin 41b of the supporting roller 41 is received in a bearing opening in the bearing block 36.

Supporting elements 44 and 45 are arranged on both supporting segments 26 and 27 in the same radial planes in which the supporting rollers 41 are located. Each of the supporting elements 44 and 45 are located between respective parallel plates 46, 47 and 48, 49 and during adjusting movement are guided by the latter. The guiding plates 46, 47 or 48, 49 are welded on the supporting segments 26 or 27. A transverse plate 50 or 51 is welded between the guiding plates 46, 47 or 48, 49 and has a threaded opening in which an adjusting screw 52 or 53 is received so that the associated supporting element 44 or 45 abuts against the adjusting screw, as can be seen in FIG. 5.

With the aid of their adjusting screws 52 or 53, the supporting elements 44 and 45 can be adjusted radially inwardly and radially outwardly on the supporting segments 26 or 27. The supporting elements 44 and 45 are held in force-locking manner on the guiding plates 46, 47 or 48, 49 by two screws 54 and 55. The screws 54 and 55 extend in elongated openings 56 and 57 provided in the guiding plates 46, 47 and 48, 49 and are released during adjustment of the supporting elements 44 and 45. Supporting jaws 58 and 59 rest on the respective supporting element 44 or 45 and are arranged on a bearing axle 60 or 61. On the bearing axle 60 and 61, supporting rollers 42 and 43 for the cover band 6 are arranged at one end of the former, and rollers 64 and 65 are rotatably arranged at the other end of the former.

The supporting rollers lying in a common radial plane, namely the supporting roller 41, the supporting roller 42, and the supporting roller 43, form a roller group, and each such roller group embodies simultaneously a supporting point 79 for the band conveyor 5 and the cover band 6. Each two axis-parallel bearing axles 60 and 61 located adjacent to one another are supported in a common bearing body 62 and 63, as can be seen in FIG. 4, whereas each bearing body 62 at one band conveyor side with each bearing body 63 at the other band conveyor side are connected by a traverse 66 overlapping the cover band 6 and the band conveyor 5. The bearing body 62 and the bearing body 63 form together the traverse 66 a bearing cross bar 67. Each cross bar 67 receives at its one end two bearing axles 60 with the respective rollers 42 and the rollers 64, and at the other end two bearing axles 61 with the respective supporting roller 43 and the roller 65, as can be seen from FIGS. 4 and 5. The cross bars 67 are pivotally connected with one another and together form a shape-variable roller holder 68 for a plurality of the position-variably supported supporting rollers 42, 43 of the cover band 6. For connecting the bearing cross bars 67, two shackle connecting members 69 and 70 are provided at each side of the band conveyor 5 and pivotally connected with one another by a pin 71. The connecting member 69 is rotatably received by the axles 60 and 61 of the bearing cross bars 67, and the connecting members 70 is received by the axles 60 and 61 of the neighboring coupled bearing cross bars 67, as shown in FIGS. 4 and 5. The thus formed roller holder 68, which is movable in a vertical plane in a chain-like manner, is connected at each side of the band conveyor by a connecting member 72 and a pin 73 pivotally on a projection 26a or 27a of the supporting segment 26 or 27, as shown in FIG. 4. Both connecting members 72 are arranged at the outwardly located bearing axles 60 and 61 of the left bearing cross bar 67 at this roller holder end instead of the second connecting member 69. The other end of the roller holder 58 is connected with a tensioning member which constantly holds the roller holder 68 tight. The tensioning member embraces at each side of the band conveyor 5 a rope 77 which is mounted by pins 74 on the traverse 67 outwardly arranged at this roller holder end, and is guided over rope rollers 75 and 76. It also embraces a weight 78 which hangs on the rope 77. Instead of the weight, other equivalent means can be used as force accumulators, such as prestressed springs, hydraulic or pneumatic cylinder-and-piston systems under pressure, etc. The construction must be selected in each case so that during reverse driving of the band conveyor 5 in both movement directions, the same tensioning member is fully operative and driving of the roller holder 68 is excluded.

As can be seen from FIG. 4, outside the supporting points 79 whose position-variably supported supporting rollers 42 and 43 are supported on the shape-variable roller holder 68, three supporting points 79 are located in the supply side region of the deflecting station 8 and their roller groups have no supporting rollers 42 and 43 supported on this roller holder 68, since in the sense of maximum position variation of the band portion 11 relative to the band portion 10 this is not required. In these three supporting points 79, the supporting rollers 41 are formed and supported in the bearing blocks 35 and 36 arranged on the supporting segments 26 and 27 similarly to the remaining supporting points 79. They differ, however, by the support of both supporting rollers 42 and 43 of each roller group or supporting point 79 whose bearing axles 60 and 61 are received in a bearing 82 mounted by screws 81 on the supporting segment 26 and 27.

The flange of each bearing 82 is guided radially by two guiding plates 84 and 85 welded on the supporting segments 26 and 27, and supported on each adjusting screws 86 which is screwed in a threaded opening of a transverse plate 87 which is welded on both guiding plates 84 and 85. After releasing the screws 81, which extend through elongated openings 83, the bearing 82 and thereby the bearing axles 60 and 61 together with the supporting rollers 42 and 43 are displaced radially outwardly or inwardly by respective actuation of the adjusting screw 86.

Figure 6:
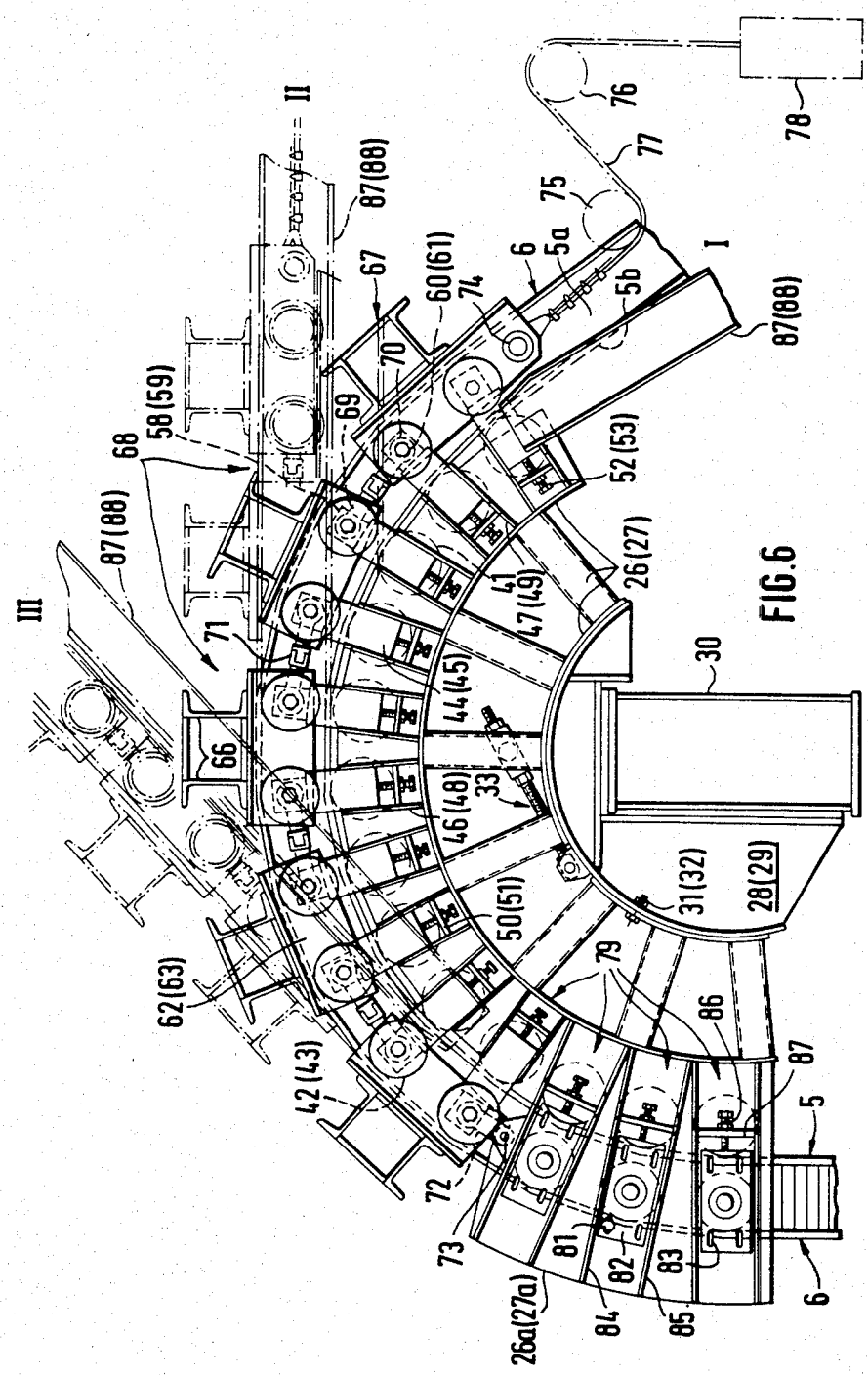
FIG. 6 is a view substantially corresponding to the view of FIG. 4, in which a roller holder for position-variable support of supporting rollers and supporting guides with associated running rollers are shown in a central position and moreover in both end positions.

For weight supporting of the roller holder 68 together with supporting rollers received by the same during positioning of the bracket 2 relative to the supporting frame 3, in which the supporting jaws 58 and 59 are lifted from the supporting elements 44 and 45, a supporting guide 87 and 88 is mounted in front of the bracket at each side with the aid of screws 89, and the bearing traverse 67 is rollingly supported on the same with the aid of both its rollers 64 and 65, as can be seen in FIGS. 4–6.

During mounting of the unloading arrangement, a distance 90 between axes of the supporting roller 41 of the band conveyor 5 and the supporting rollers 42, 43 of the cover band 6 is adjusted by respective actuation of adjusting means formed by the adjusting screws 52, 53 and associated with the supporting rollers. This adjustment is performed so that the cover band 6 and the corrugated edges 5a in the deviating station have a touching contact with one another, but no force is transmitted from the cover band 6 to the corrugated edges 5a of the band conveyor 5, and also in unfavorable position of the bracket 2, see FIG. 3, FIG. 6—position I. The respectively adjusted supporting rollers 42 and 43 hold the cover band 6 in position so that neither friction due to relative movement nor damaging pressure can take place. Thereby the corrugated edges 5a during running of the band conveyor 5 through the deviating station 8 can fully unobjectionably pull from one another and toward one another and excessive wear and destruction of the corrugated edges 5a and the cover band 6 are reliably prevented.

When the bracket 2 is adjusted relative to the supporting frame 3, or vice versa, the supporting frame 3 is turned relative to the bracket 2 during running of the band conveyor 5 and the cover band 6, the supporting rollers 42 and 43 turn because of the inventive arrangement on a shape-variable roller holder 68 synchronously with the bracket 2, band conveyor 5 and cover band 6 and maintain the adjusted position of the cover band 6 relative to the corrugated edges 5a of the band conveyor 5. By the thus produced lifting of the supporting jaws 58 and 59 from the supporting elements 44 and 45, their supporting function is lost, but this supporting function is taken over by both supporting guides 87 and 88 with interposition of the rollers 64 and 65. An unobjectionable operation of the supporting rollers 51-43 of all supporting points 79 is guaranteed also during relative movement between the bracket 1 and the supporting frame 3, or between the band portion 11 and the band portion 10, because of the above mentioned automatic adaptation, both in the sense of the damaging pressure between the corrugated edges 5a and the cover band 6, and also in the sense of a sufficient closing or sealing of the band conveyor 5 at the side of the cover band 6.

The inventive deviating station can have a modified construction. In the event when the space conditions allow, the supporting segments 26 and 27 together with the axle segments 28 and 29 can, for example, be replaced by a drum which receives instead of the supporting rollers 41 the belt 5b of the band conveyor 5. The supporting rollers 41 can be shaped cylindrically or spherically and formed individually adjustable at both ends. Furthermore, the supporting guides 87 and 88 cooperating with the rollers 64 and 65 can be displaceably arranged on the bracket. Further, the position-variably supported supporting rollers of the roller groups of all supporting points for the cover band or the band conveyor can be arranged on a shape-variable roller holder, for example when a relative adjustment between the bracket 2 and the supporting frame 3 is required to obtain an extremely great angle between the band portions 10 and 11.

It will be understood that each of the elements described above, or two or more together, may also find a useful application in other types of construction differing from the types described above.

While the invention has been illustrated and described as embodied in a deviating station for handling arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A deviating station for a handling arrangement with a supporting frame and conveying means including a movable band conveyor element which has at least two conveyor portions and is closed by a movable cover band element, the deviating station comprising
a plurality of supporting rollers arranged on the supporting frame in groups so as to form a plurality of supporting points for the band conveyor element and the cover band element;
a shape-variable roller holder which is arranged to support the supporting rollers of at least some of the supporting points of at least one of the movable elements of the conveying means and follows the movement of the band conveyor element and the cover band element, said roller holder being formed as a link chain with two ends one of which is pivotally connected with the supporting frame; and
tensioning means connected with the other end of said link chain formed by said roller holder.

2. A deviating station as defined in claim 1, wherein said groups of supporting rollers include radially outer supporting rollers and radially inner supporting rollers, said roller holder being arranged to support the radially outer supporting rollers of the movable cover band element of the conveying means.

3. A deviating station as defined in claim 1, wherein said roller holder includes a plurality of bearing crossbars which bridge the band conveyor element and the cover band element, and a plurality of connecting members which pivotally connect said bearing crossbars with one another; and further comprising a plurality of radially guided supporting elements mounted on the supporting frame and supporting both ends of each of said bearing crossbars, and adjusting means arranged to adjust said supporting elements.

4. A deviating station as defined in claim 3, wherein each bearing crossbar includes a traverse bridging the band conveyor element and the cover band element, and two bearing bodies arranged at the longitudinal sides of the band conveyor element and connected with said traverse, each of said bearing bodies receiving at least one bearing axle which supports at least one of the movable elements of the conveyor means.

5. A deviating station as defined in claim 4; and further comprising supporting guides connected with the respective conveyor portion to form a movable unit, said bearing axles of said supporting rollers being simultaneously formed as bearing axles of said running rollers.

6. A deviating station as defined in claim 1; and further comprising supporting guides connected with the respective conveyor portion to form a movable unit, said roller holder being provided at both sides of said band conveyor element with running rollers cooperating at each side of the band conveyor element with said supporting guides.

7. A deviating station for a handling arrangement with a supporting frame and conveying means including a movable band conveyor element which has at least two conveyor portions and is closed by a movable cover band element, the deviating station comprising
- a plurality of supporting rollers arranged on the supporting frame in groups so as to form a plurality of supporting points for the band conveyor element and the cover band element;
- a shape-variable roller holder which is arranged to support the supporting rollers of at least some of the supporting points of at least one of the movable elements of the conveying means and follows the movement of the band conveyor element and the cover band element,
- two supporting segments arranged on the supporting frame; axle segments supporting said supporting segments in the regions of longitudinal sides of the band conveyor element; adjusting means arranged to adjust said supporting segments on said axle segments; and
- a common axle bar mounting said axle segments and embodying a deviating axis of the deviating station.

8. A handling arrangement, comprising
- a supporting frame;
- conveying means including a movable band conveyor element which has least two conveyor portions and is closed by a movable cover band element;
- a deviating station including a plurality of supporting rollers arranged on said supporting frame in groups so as to form a plurality of supporting points for said band conveyor element and said cover band element;
- a shape-variable roller holder which is arranged to support the supporting rollers of at least some of the supporting points of at least one of said movable elements of said conveying means and follows the movement of the band conveyor element and the cover band element, said roller holder being formed as a link chain with two ends one of which is pivotally connected with the supporting frame; and
- tensioning means connected with the other end of said link chain formed by said roller holder.

9. A handling arrangement, comprising
- a supporting frame;
- conveying means including a movable band conveyor element which has at least two conveyor portions and is closed by a movable cover band element;
- a deviating station including a plurality of supporting rollers arranged on said supporting frame in groups so as to form a plurality of supporting points for said band conveyor element and said cover band element;
- a shape-variable roller holder which is arranged to support the supporting rollers of at least some of the supporting points of at least one of said movable elements of said conveying means and follows the movement of the band conveyor element and the cover band element;
- two supporting segments arranged on the supporting frame; axle segments supporting said supporting segments in the regions of longitudinal sides of the band conveyor element;
- adjusting means arranged to adjust said supporting segments on said axle segments; and
- a common axle bar mounting said axle segments and embodying a deviating axis of the deviating station.

* * * * *